United States Patent [19]

Liang et al.

[11] 4,448,903
[45] May 15, 1984

[54] NOVEL SYSTEM FOR THE PRODUCTION OF POLYURETHANES

[75] Inventors: Tai-Ming Liang, Pittsburgh; Keith G. Spitler, Bethel Park, both of Pa.

[73] Assignee: Mobay Chemical Corporation, Pittsburgh, Pa.

[21] Appl. No.: 517,167

[22] Filed: Jul. 25, 1983

[51] Int. Cl.$^3$ .................. C08G 18/14; C08G 18/63; C09K 3/00
[52] U.S. Cl. .................................. 521/137; 252/182; 528/75
[58] Field of Search ................ 521/137; 252/182; 528/75

[56] References Cited

U.S. PATENT DOCUMENTS

| | | | |
|---|---|---|---|
| Re. 28,715 | 2/1976 | Stamberger | 260/33.2 R |
| Re. 29,118 | 1/1977 | Stamberger | 260/2.5 BE |
| 4,125,505 | 11/1978 | Critchfield et al. | 260/33.2 R |
| 4,166,889 | 9/1979 | Fujii et al. | 521/55 |
| 4,198,488 | 4/1980 | Drake et al. | 521/137 |
| 4,202,950 | 5/1980 | Statton | 525/123 |
| 4,208,314 | 6/1980 | Priest et al. | 260/33.2 R |
| 4,226,756 | 10/1980 | Critchfield et al. | 260/33.2 R |
| 4,230,823 | 10/1980 | Alberts et al. | 521/137 |

*Primary Examiner*—H. S. Cockeram
*Attorney, Agent, or Firm*—Gene Harsh; Joseph C. Gil

[57] ABSTRACT

The present invention is directed to a blend of a polyether polyol and a polymer polyol, the blend having a solids content of from about 2 to about 15 percent by weight and the use of such blends in manufacturing polyurethane products.

12 Claims, No Drawings

NOVEL SYSTEM FOR THE PRODUCTION OF POLYURETHANES

BACKGROUND OF THE INVENTION

Systems are commercially available which are used in the production of polyurethane shoe soles. In general, these systems comprise a polyether diol, a polyether triol, a chain extender (such as 1,4-butane-diol or ethylene glycol), blowing agent, catalyst and surfactant. When mixed with an isocyanate, these systems yield polyurethane products which have met with some commercial success. The amounts of triol and chain extender are generally chosen to give the best balance of green strength and low temperature flex-fatigue resistance. Although the systems have met with some success, they do suffer certain disadvantages. Specifically, it is possible to increase the low temperature flex-fatigue resistance, but the green strength of the product upon removal from the mold will then suffer. Similarly, it is possible to enhance the green strength, but the low temperature flex-fatigue resistance will suffer. Finally, known systems can only be used over relatively narrow isocyanate indices (e.g., from 98 to 100).

Polymer polyols prepared by polymerizing one or more ethylenically unsaturated monomers in a relatively high molecular weight organic compound containing at least two hydroxyl groups are known and are used extensively in the flexible foam area (see, e.g., U.S. Pat. Nos. Re. 28,715 and 29,118).

DESCRIPTION OF THE INVENTION

The present invention is directed to the discovery of a system which will allow for the production of materials having both low temperature flex-fatigue resistance and green strength superior to those currently known and used in the art. Additionally, the system of the present invention is not as sensitive to the isocyanate index, i.e., the system allows for the use of a broader isocyanate index range than known systems to attain the improved results herein. Other properties such as hardness, tensile strength and tear strength are at least equal to those obtained from conventional systems.

The invention is thus broadly directed to a polyurethane product, the process of its manufacture, a novel polyol blend for use therein, and a novel blend to be used as the B-side of a polyurethane system.

More particularly, the present invention is directed to a polyurethane product formed by reacting:

(a) an isocyanate selected from the group consisting of 4,4'-diisocyanatodiphenylmethane, isocyanates based on 4,4'-diisocyanatodiphenylmethane, and mixtures thereof, (b) at least one polyether polyol having at least two and no more than three hydroxyl groups, (c) at least one polymer polyol prepared by polymerizing an ethylenically unsaturated monomer or monomers in a relatively high molecular weight organic compound containing at least two hydroxyl groups, the amount of polymer polyol being such that the combination of component (b) and component (c) has an average hydroxy functionality of from about 2.10 to about 2.30, and a solids content of from about 2 to about 15 percent by weight, and (d) from about 5 to about 15 percent by weight, based on the total weight of components (b), (c) and (d) of a compound selected from the group consisting of ethylene glycol, 1,4-butanediol and mixtures thereof, in the presence of (e) a blowing agent, and optionally, catalyst and a surfactant, wherein the amount of component (a) is such that the isocyanate index is from about 94 to about 105.

The present invention is also directed to a process of producing a polyurethane product comprising reacting:

(a) an isocyanate selected from the group consisting of 4,4'-diisocyanatodiphenylmethane, isocyanates based on 4,4'-diisocyanatodiphenylmethane, and mixtures thereof, (b) at least one polyether polyol having at least two and no more than three hydroxyl groups, (c) at least one polymer polyol prepared by polymerizing an ethylenically unsaturated monomer or monomers in a relatively high molecular weight organic compound containing at least two hydroxyl groups, the amount of polymer polyol being such that the combination of component (b) and component (c) has an average hydroxyl functionality of from about 2.10 to about 2.30, and a solids content of from about 2 to about 15 percent by weight, and (d) from about 5 to about 15 percent by weight, based on the total weight of components (b), (c) and (d) of a compound selected from the group consisting of ethylene glycol, 1,4-butanediol and mixtures thereof, in the presence of (e) a blowing agent, and optionally, catalyst and a surfactant, wherein the amount of component (a) is such that the isocyanate index is from about 94 to about 105.

The invention is also directed to a polyol blend comprising (b) at least one polyether polyol having at least two and no more than three hydroxyl groups, and (c) at least one polymer polyol prepared by polymerizing an ethylenically unsaturated monomer or monomers in a relatively high molecular weight organic compound containing at least two hydroxyl groups, the amount of polymer polyol being such that the combination of component (b) and component (c) has an average hydroxyl functionality of from about 2.10 to about 2.30, and a solids content of from about 2 to about 15 percent by weight.

The invention is also directed to a blend which can be used as the B-side of a polyurethane system, comprising (b) at least one polyether polyol having at least two and no more than three hydroxyl groups, (c) at least one polymer polyol prepared by polymerizing an ethylenically unsaturated monomer or monomers in a relatively high molecular weight organic compound containing at least two hydroxyl groups, the amount of polymer polyol being such that the combination of component (b) and component (c) has an average hydroxyl functionality of from about 2.10 to about 2.30, and a solids content of from about 2 to about 15 percent by weight, and (d) from about 5 to about 15 percent by weight, based on the total weight of components (b), (c) and (d) of a compound selected from the group consisting of ethylene gylcol, 1,4-butanediol and mixtures thereof, (e) a blowing agent, and optionally, catalyst and a surfactant.

The isocyanates used as starting component (a) according to the present invention are 4,4'-diisocyanatodiphenylmethane, isocyanates based on 4,4'-diisocyanatodiphenylmethane, and mixtures thereof. Specifically excluded are the polyphenylpolymethylene polyisocyanates which may be obtained by aniline-formaldehyde condensation followed by phosgenation, and which contain more than 10 percent by weight of isocyanates having functionalities of 3 or more.

From a practical standpoint, it is preferred that the isocyanate be liquid at room temperature. The presently preferred isocyanates are liquid polyisocyanates having urethane groups, which may be obtained by reacting one mole of 4,4'-diisocyanatodiphenylmethane with from 0.05 to 0.3 moles of low molecular weight diols or triols, preferably with polypropylene glycols having molecular weights below 700 (see, e.g., U.S. Pat. No. 3,644,457). Also useful are liquid partially carbodiimidized 4,4'-diisocyanatodiphenylmethanes of the type described in U.S. Pat. Nos. 3,152,162 and 4,154,752.

The quantity of isocyanate (component (a)) used in the present invention is calculated so that the total mixture of all the components has an isocyanate index of from about 94 to about 105. By "isocyanate index" is meant the quotient of the number of isocyanate groups and number of groups which are reactive with isocyanates multiplied by 100.

The compounds used as component (b) in the present invention are polyether polyols having at least two and no more than three hydroxyl groups. The polyethers useful herein preferably have molecular weights of from 1800 to 12000 and most preferably from 3000 to 7000. As is known in the art, such polyethers may be prepared, e.g., by polymerization of epoxides such as ethylene oxide, propylene oxide, butylene oxide, tetrahydrofuran, styrene oxide or epichlorohydrin, either on their own, e.g., in the presence of $BF_3$, or by a process of chemical addition of these epoxides, optionally as mixtures or successively, to starting components having reactive hydrogen atoms such as water, ammonia or alcohols. Examples of suitable starting components include ethylene glycol, propylene glycol-(1,3) or -(1,2), trimethylolpropane, aniline, ethanolamine, glycerin or the like. It is preferred to use polyethers which contain predominant amounts of primary OH groups (i.e., more than 50% by weight based on all the OH groups present in the polyether). Mixtures of any of the polyethers noted above are also useful. For purposes of the present invention in calculating the average functionality of the blend of components (b) and (c), the hydroxyl functionality of component (b) will be considered to be the same as the functionality of the starting component. In reality, of course, the actual hydroxyl functionality of the polyether will be slightly less than the functionality of the starting component.

Component (c) of the present invention is a polymer polyol prepared by polymerizing one or more ethylenically unsaturated monomers in a relatively high molecular weight organic compound containing at least two hydroxyl groups.

The polymer polyols useful herein are known and are commercially available. Typical preparations of such polyols are disclosed in U.S. Pat. Nos. Re. 28,715 and 29,118, the disclosures of which are herein incorporated by reference. Polymer polyols are available commercially from such companies as Bayer AG, Union Carbide and BASF.

Polymer polyols may be characterized as dispersions of vinyl polymers (such as polyacrylonitrile and copolymers of acrylonitrile and styrene) in a base polyol (which is typically a polyether polyol). Such dispersions also contain some polymers grafted on the base polyol. Because of the much higher molecular weight and relatively small amount present, the vinyl polymer and graft polymer portions are treated as organic fillers having zero hydroxyl functionality. In other words, for purposes of calculating the average functionality as defined herein, the functionality of the polymer polyol will be the same as the hydroxyl functionality of the base polyol. The functionality of the base polyol, in the case where the base polyol is a polyether, will be the same as the functionality of the starter used to make the base polyether. Thus, for example, where the base polyol used to make a polymer polyol is a propylene glycol initiated polyether, the functionality of the polymer polyol will be 2. In calculating the mole fraction, the solids content of the particular polymer polyol is subtracted from the total weight of the polymer polyol.

The following TABLE 1 lists suitable commercially available Niax polymer polyols from Union Carbide. It is presently preferred to use those polymer polyols which contain primary hydroxyl groups. The total solids content is determined by adding the polyacrylonitrile and polystyrene contents.

TABLE 1

| | Viscosity at 25° C. Centipoises | Apparent Specific Gravity at 20/20° C. | Hydroxyl Number | Polyacrylonitrile, % by wt. | Polystyrene, % by wt. | Molecular Weight Base Polyol | Functionality Base Polyol | OH Group Type |
| --- | --- | --- | --- | --- | --- | --- | --- | --- |
| 34-45 | 1267 | 1.027 | 45.0 | 9.9 | 8.1 | 3000 | 3 | Secondary |
| 34-37 | 1563 | 1.037 | 36.8 | 9.0 | 9.0 | 3600 | 3 | Secondary |
| 37-36 | 1771 | 1.057 | 34.8 | 7.2 | 10.8 | 3800 | 3 | Secondary |
| 24-32 | 1211 | 1.036 | 32.0 | 10.0 | 10.0 | 2800 | 2 | Primary |
| 31-28 | 3000 | 1.050 | 28.0 | 21.0 | — | 5000 | 3 | Primary |
| 34-28 | 1958 | 1.043 | 28.0 | 10.9 | 10.1 | 5000 | 3 | Primary |
| 32-10 | 1200 | 1.030 | 32.5 | 4.4 | 4.0 | 5000 | 3 | Primary |
| 32-33 | 994 | 1.034 | 34.0 | 4.2 | — | 5000 | 3 | Primary |
| 35-25 | 3000 | 1.056 | 25.6 | 21.6 | 6.4 | 5000 | 3 | Primary |
| 39-36 | 2900 | 1.057 | 35.5 | 26.1 | 7.4 | 3100 | | |

As noted previously, the polymer polyols are added to component (b) in an amount such that the mixture of components (b) and (c) has an average functionality of from about 2.10 to about 2.30, and a solids content of from about 2 to about 15 percent by weight. Preferably, the solids content of the mixture is from about 4 to about 10 percent by weight. It has been found that this relatively narrow range is essential to obtain superior low temperature flex-fatigue resistance as well as improved green strength.

As indicated, the blend of component (b) (i.e., the polyether diol or triol) and component (c) (i.e., the polymer polyol) must have an average functionality of from about 2.10 to about 2.30. For purposes of this invention, the average functionality of such a blend can be calculated by the following equation (I)

$$\bar{f} = f_i N_i / N_i \tag{I}$$

where $\bar{f}$ is the average hydroxy functionality of the blend;

$f_i$ is the hydroxy functionality of each component polyol i, and $N_i$ is the number of moles of each component polyol i.

$N_i$ in turn is calculated by the following equation (II)

$$N_i = W_i / MW_i \tag{II}$$

where $W_i$ is the weight of polyol i in the blend, and $MW_i$ is the number average molecular weight of polyol i.

Thus, if the molecular weight and functionality of each component are known, $\bar{f}$ can be easily determined. As noted earlier, the functionality ($f_i$) of component (b) is assumed to be the functionality of the starter component. Thus, for example, for a glycerin-initiated polyether polyol, the functionality of the polyether will be treated as 3 for purposes of the present invention. A calculation of an average functionality of one blend used in the examples is set forth for illustrative purposes following the examples.

Another necessary component of the present invention is a compound selected from the group consisting of 1,4-butanediol, ethylene glycol and mixtures thereof. The amount of such material is from about 5 to about 15 percent by weight, and preferably from about 5 to about 10 percent by weight, based on the total amount of components (b), (c) and (d). Again, this narrow range is essential to obtaining the improved results herein.

According to the invention, water and/or readily volatile organic substances are used as blowing agents. Organic blowing agents include acetone, ethyl acetate, halogen-substituted alkanes, such as methylene chloride, chloroform, ethylidene chloride, vinylidene chloride, monofluorotrichloromethane, chlorodifluoromethane, and dichlorodifluoromethane; butane, hexane, heptane, diethyl ether and the like. A blowing effect may also be obtained by adding compounds such as azo-compounds which decompose at temperatures above room temperature giving off gases (such as nitrogen). A suitable azo-compound is azoisobutyronitrile. Further examples of blowing agents and information on the use of blowing agents may be found in Kunststoff-Handbuch, Vol. VII, Vieweg and Hochtlen, Carl-Hanser-Verlag, Munich, 1966, pages 108 and 109, 453–455 and 507–510.

In many cases, catalysts are also used in producing the foams in accordance with the invention. Suitable known catalysts include tertiary amines, such as triethylamine, tributylamine, N-methyl morpholine, N-ethyl morpholine, N-coco-morpholine, N,N,N',N'-tetramethyl ethylene diamine, 1,4-diazabicyclo-(2,2,2)-octane, N-methyl-N'-dimethyl amino ethyl piperazine, N,N-dimethyl benzylamine, bis-(N,N-diethylaminoethyl)-adipate, N,N-diethyl benzylamine, pentamethyl diethylene triamine, N,N-dimethyl cyclohexylamine, N,N,N',N'-tetramethyl-1,3-butane diamine, N,N-dimethyl-β-phenylethyl amine, 1,2-dimethylimidazole and 2-methylimidazole.

Tertiary amines containing isocyanate-reactive hydrogen atoms may also be used as catalysts and include N-methyl diethanolamine, N-ethyl diethanolamine, N,N-dimethyl ethanolamine, also their reaction products with alkylene oxides, such as propylene oxide and/or ethylene oxide. The use levels of such catalysts will be lower than for non-reactive catalysts.

Other suitable catalysts include sila-amines with carbon-silicon bonds of the type described, for example, in U.S. Pat. No. 3,620,984. Specific examples include 2,2,4-trimethyl-2-silamorpholine and 1,3-diethylaminomethyl tetramethyl disiloxane.

According to the invention, organometallic compounds and more especially organo tin compounds may also be used as catalysts.

Preferred organo tin compounds including tin mercaptides and tin (II) salts of carboxylic acids, such as tin (II) acetate, tin (II) octoate, tin (II) ethylhexoate and tin (II) laurate, and tin (IV) compounds such as dibutyl tin oxide, dibutyl tin dichloride, dibutyl tin diacetate, dibutyl tin dilaurate, dibutyl tin maleate or dioctyl tin diacetate. It is of course possible to use any of the above-mentioned catalysts in the form of mixtures.

Further representatives of catalysts suitable for use in accordance with the invention and information on the way in which they work may be found in Kunststoff-Handbuch, Vol. VII, by Vieweg and Hochtlen, Carl-Hanser-Verlag, Munich, 1966, for example on pages 96 to 102.

The catalysts are generally used in a quantity of from 0.001 to as high as 10% by weight based on the quantities of components (b) and (c). In general, it is preferred to keep the catalyst content as low as possible for economic reasons.

According to the invention, it is also possible to use surface-active additives, such as emulsifiers and foam stabilizers.

Suitable foam stabilizers include polyether siloxanes, especially those which are water-soluble. These compounds are generally synthesized in such a way that a copolymer of ethylene oxide and propylene oxide is attached to a polydimethylsiloxane radical. Foam stabilizers of this type are described, for example, in U.S. Pat. Nos. 2,834,748; 2,917,480 and 3,629,308.

According to the invention, it is also possible to use reaction retarders such as acid-reacting substances (e.g., hydrochloric acid or organic acid halides), cell regulators, such as paraffins, fatty alcohols or dimethyl polysiloxanes; pigments, dyes, flame-proofing agents, such as tris-chloroethyl phosphate, tricresyl phosphate or ammonium phosphate and polyphosphate; stabilizers against ageing and weathering; plasticizers, fungistatic and bacterio-static compounds and fillers, such as barium sulphate, kieselguhr, carbon black or whiting.

Other examples of surface-active additives, foam stabilizers, cell regulators, reaction retarders, stabilizers, flameproofing agents, plasticizers, dyes, fillers and fungistatic and bacteriostatic compounds, optionally used in accordance with the invention, and also details on the way additives of this type are used and the way in which they work may be found in Kunststoff-Handbuch, Vol. VII, Vieweg and Hochtlen, Carl-Hanser-Verlag, Munich, 1966, pages 103–113.

According to the invention, the reaction components may be reacted by the known one-stage process, by the prepolymer process or by the semi-prepolymer process, in many cases using machines, for example, those of the type described in U.S. Pat. No. 2,764,565. Particulars of processing machines which may also be used in accordance with the invention may be found in Kunststoff-Handbuch, Vol. VII, Vieweg and Hochtlen, Carl-Hanser-Verlag, Munich, 1966, pages 121–205.

According to the invention, the products are often produced in molds. To this end, the reaction mixture is introduced into a mold. Suitable mold materials include metals (for example, aluminum) or plastics (for example, epoxide resin).

The products of the present invention are eminently suitable for the production of polyurethane shoe soles.

The present invention is illustrated by the following examples. Unless otherwise indicated, parts are parts by weight and percentages, percents by weight.

EXAMPLES

The following materials were used in the examples:
(a) MMDI is a modified isocyanate prepared by reacting 4,4'-diisocyanatodiphenylmethane with tripropylene glycol, the resultant product having an NCO group content of about 23 percent by weight.
(b) Polyol A is a polyether diol having an OH number of about 28 and is prepared from propylene glycol, propylene oxide and ethylene oxide, the weight ratio of propylene oxide to ethylene oxide being about 4:1.
(c) Polyol B is a polyether triol having an OH number of about 35 and is prepared from glycerin, propylene oxide and ethylene oxide, the weight ratio of propylene oxide to ethylene oxide being about 7:1.
(d) BAYFIT 3699: a polymer polyol having a solids content of 20 percent by weight, available from Bayer AG. It is produced by the in situ polymerization of 12 parts by weight acrylonitrile and 8 parts by weight of styrene in 80 parts by weight of a trimethylolpropane-initiated polyoxypropyleneoxyethylene)ether. The ether (or base polyol) has a functionality of 3 and an OH number of about 35.
(e) Niax Polymer Polyols from Union Carbide: Niax 24-32, Niax 34-28, Niax 31-28 and Niax 35-25 were used. Their typical properties were shown earlier in Table 1.
(f) BD is 1,4-butanediol.
(g) Dabco is triethylene diamine, commercially available from Air Products.
(h) T-12 is dibutyltin dilaurate.
(i) SO is a commercially available polydimethyl siloxane with a viscosity of 15,500 to 19,500 cps at 25° C.
(j) R-11-B is a stabilized monofluorotrichloromethane from Pennwalt.

The examples were carried out using a DESMA PSA 70 machine, a typical low pressure polyurethane shoe sole machine under the following processing parameters:
(a) temperature of component A, the MMDI: 25±2° C.;
(b) temperature of component B, i.e. the blend of polyether polyols, polymer polyols (when used), chain extender, catalysts, blowing agents, and surfactants: 25±2° C.;
(c) mixing screw speed: 18,000 rpm;
(d) mold temperature: 120°-130° F.;
(e) through-put: 50-60 g/sec.

The liquid reaction mixture was quickly poured into either a flat-heel unit sole mold or a 6"×6"×¼" plaque mold. All unit soles and plaques were molded at a density of 0.55±0.03 g/cc.

The green strength of the unit soles which were demolded from the mold at specified demold times was judged according to postblow, and/or if the unit soles were easily deformed by bending and squeezing.

Rossflex was measured according to ASTM D-1052 except that the thickness of specimens were 0.415±0.020 inch (instead of 0.250 inch), and the testing temperature was 0° F. (instead of −20° F.). All Rossflex specimens were die cut from the unit soles.

The ¼" thick plaques were used to measure the shore A hardness (ASTM D-2240), the tensile strength and the elongation at break (ASTM D-412). The split tear strength of ¼" plaques was measured according to ASTM D-3574, Test F with the following exceptions:
(a) the size of the specimen was 1"×4"×¼",
(b) the specimen was horizontally sliced along the longitudinal axis of the specimen; the cut was 1" long, and
(c) the specimen was then torn at the rate of 2 in. per minute on an Instron tester.

A series of polyol blends were prepared by mixing the components noted in Table 2. The resultant polyol blends had the average functionalities and solids contents noted in Table 2.

TABLE 2

| | POLYOL BLENDS | | | | | | | | | | |
|---|---|---|---|---|---|---|---|---|---|---|---|
| | Control | | | | | Comparative | | | | Comparative | |
| Polyol Blend # | I | II | III | IV | V | VI | VII | VIII | IX | X | XI |
| Polyol A, f = 2 parts by weight | 78.5 | 78.5 | 78.5 | 78.5 | 55.5 | 77.5 | 66.5 | 50.0 | 50.0 | 52.0 | 7.0 |
| Polyol B, f = 3 parts by weight | 21.5 | — | — | — | 21.5 | — | 12.0 | — | — | 12.0 | 18.0 |
| Bayfit 3699 f = 3 parts by weight | — | 21.5 | — | — | — | — | — | — | — | — | — |
| Niax 34-28 f = 3 parts by weight | — | — | 21.5 | — | — | — | 21.5 | 17.0 | 38.0 | — | — |
| Niax 31-28 f = 3 parts by weight | — | — | — | 21.5 | — | — | — | — | — | — | — |
| Niax 24-32 f = 2 parts by weight | — | — | — | — | 23.0 | 22.5 | — | 33.0 | 12.0 | — | 75.0 |
| Niax 35-25 f = 3 parts by weight | — | — | — | — | — | — | — | — | 36.0 | — | — |
| Average calculated f of Blend | 2.18 | 2.15 | 2.15 | 2.15 | 2.17 | 2.0 | 2.26 | 2.11 | 2.27 | 2.37 | 2.14 |
| Solids Content | 0 | 4.3 | 4.5 | 4.5 | 4.6 | 4.5 | 4.5 | 10.2 | 10.4 | 10.1 | 15.0 |

TABLE 2-continued

| | POLYOL BLENDS | | | | | | | | | | |
|---|---|---|---|---|---|---|---|---|---|---|---|
| Polyol Blend # | Control I | II | III | IV | V | Comparative VI | VII | VIII | IX | Comparative X | XI |
| of Blend % by weight | | | | | | | | | | | |

In each of the examples which follow, a B-side was prepared by blending the following:

| | Weight Percent |
|---|---|
| Polyol Blend | 86.42 |
| BD | 6.71 |
| Dabco | 0.58 |
| T-12 | 0.02 |
| Water | 0.15 |
| R-11-B | 6.04 |
| SO | 0.08 |

Examples 1 through 5

B-sides made according to the above-noted formulation were made from Polyol Blends I through V. Each B-side was then reacted with the MMDI at the isocyanate indexes shown in Table 3. The products were tested, with the results set forth in Table 3. As shown by the results set forth in Table 3, the blends of the present invention yield good green strength and superior Rossflex results over a much wider range of isocyanate indexes, when compared to Example 1. Further, as shown, the results achieved are independent of the nature of the polymer in the polymer polyol, i.e. whether it is acrylonitrile modified (Example 4) or acrylonitrile/styrene modified (Examples 2 and 3). As shown, the results depend on the average functionality and on the total solids content of the polyol blend.

TABLE 3

| Example # | 1 | | | | 2 | | | | 3 | | | |
|---|---|---|---|---|---|---|---|---|---|---|---|---|
| Polyol Blend | I | | | | II | | | | III | | | |
| Solids Content Blend, % by wt | 0 | | | | 4.3 | | | | 4.5 | | | |
| Average calculated f of blend | 2.18 | | | | 2.15 | | | | 2.15 | | | |
| Isocyanate Index | 95 | 97 | 100 | 103 | 94 | 97 | 100 | 103 | 94 | 97 | 100 | 103 |
| Rossflex @ 0° F. | | | | | | | | | | | | |
| Cycles (10³) | 150 | 110 | 43 | 53 | ←—150—→ | | | | ←—150—→ | | | |
| Cut % | 0 | 900 | 900 | 900 | ←—0—→ | | | | ←—0—→ | | | |
| Green Strength @ 3 minute demold | poor with sinking | good | good | poor with postblow | good | → | → | fair | good | → | → | fair |
| Hardness (Shore A) | 43 | 46 | 50 | 52 | 48 | 49 | 50 | 51 | 47 | 48 | 49 | 50 |
| Tensile Strength (psi) | 500 | 550 | 580 | 620 | — | 600 | 600 | — | — | 580 | 650 | — |
| Elongation (%) | 480 | 450 | 460 | 440 | — | 450 | 445 | — | — | 460 | 440 | — |
| Split Tear (pli) | 19 | 16 | 15 | 12 | — | 18 | 19 | — | — | 18 | 19 | — |

| Example # | 4 | | | | 5 | | | |
|---|---|---|---|---|---|---|---|---|
| Polyol Blend | IV | | | | V | | | |
| Solids Content Blend, % by wt | 4.5 | | | | 4.6 | | | |
| Average calculated f of blend | 2.15 | | | | 2.17 | | | |
| Isocyanate Index | 95 | 97 | 100 | 102 | 94 | 97 | 101 | 104 |
| Rossflex @ 0° F. | | | | | | | | |
| Cycles (10³) | ←—150—→ | | | 138 | 150 | 150 | 150 | |
| Cut % | ←—0—→ | | | 900 | 0 | 0 | 0 | |
| Green Strength @ 3 minute demold | good | → | → | fair | fair | good | good | fair |
| Hardness (Shore A) | 47 | 48 | 49 | 50 | 48 | 49 | 50 | 50 |
| Tensile Strength (psi) | — | 550 | 600 | — | — | 600 | 600 | — |
| Elongation (%) | — | 470 | 460 | — | — | 470 | 450 | — |
| Split Tear (pli) | — | 18 | 18 | — | — | 17 | 19 | — |

Examples 6 through 11

B-sides made according to the above-noted formulation were made from Polyol Blends VI through XI. Each B-side was then reacted with the MMDI at the isocyanate indexes shown in Table 4. The products were tested, with the results set forth in Table 4. The importance of average functionality and solids content are further shown by these examples. Examples 6 and 10 are not within the present invention and are included for comparison.

TABLE 4

| Example # | 6 | | | | 7 | | | | 8 | | | |
|---|---|---|---|---|---|---|---|---|---|---|---|---|
| Polyol Blend | VI | | | | VII | | | | VIII | | | |
| Solids Content Blend, % by wt | 4.5 | | | | 4.5 | | | | 10.2 | | | |
| Avg. f of Blend | 2.00 | | | | 2.26 | | | | 2.11 | | | |
| Isocyanate Index | 94 | 98 | 100 | 102 | 94 | 98 | 100 | 102 | 94 | 98 | 101 | 103 |
| Rossflex @ 0° F. Cycles ($10^3$) | 34 | 150 | 150 | 150 | 150 | 150 | 110 | 63 | ←—150—→ | | | |
| % | 900 | 300 | 200 | 50 | 0 | 0 | 900 | 900 | 80 | 0 | 0 | 0 |
| Green Strength @ 3 minute demold | poor with postblow | fair | fair | good | → | → | → | | poor | ← | good | → |
| Hardness (Shore A) | 49 | 50 | 50 | 51 | 49 | 50 | 51 | 52 | 52 | 53 | 56 | 59 |

| Example # | 9 | | | | 10 | | | | 11 | | | |
|---|---|---|---|---|---|---|---|---|---|---|---|---|
| Polyol Blend | IX | | | | X | | | | XI | | | |
| Solids Content Blend, % by wt | 10.4 | | | | 10.1 | | | | 15.0 | | | |
| Avg. f of Blend | 2.27 | | | | 2.37 | | | | 2.14 | | | |
| Isocyanate Index | 94 | 97 | 100 | 102 | 95 | 97 | 100 | 103 | 94 | 96 | 100 | 104 |
| Rossflex @ 0° F. Cycles ($10^3$) | 150 | 150 | 115 | 70 | 75 | 34 | 34 | 28 | 150 | 150 | 47 | 26 |
| Cut % | 0 | 0 | 900 | 900 | ←—900—→ | | | 80 | 430 | 900 | 900 | |
| Green Strength @ 3 minute demold | good | → | → | → | ←—good—→ @ 2 minutes | | | | ←—good—→ | | | |
| Hardness (Shore A) | 51 | 52 | 53 | 55 | 55 | 56 | 56 | 57 | 62 | 60 | 61 | 64 |

Sample Average Functionality Calculation

Polyol Blend #3
78.5 parts by weight of Polyol A
Polyol A: f=2
$MW_A=4000$
21.5 parts by weight of Niax 34-28
Niax 34-28: f=3 (the functionality of the base polyol),
MW=5000 (molecular weight of the base polyol)

$$\bar{f} = \frac{f_A n_A + f_{34-28} n_{34-28}}{n_A + n_{34-28}}$$

$n_A = 78.5 \div 4000$
$n_{34-28} = (21.5)(0.79) \div 5000$
note: 0.79 is used since polymer polyol contains 21% polymer solids assumed to have zero functionality $$\bar{f} = \frac{(2)\left(\frac{78.5}{4000}\right) + (3)\left(\frac{(21.5)(0.79)}{5000}\right)}{\frac{78.5}{4000} + \frac{(21.5)(0.79)}{5000}} = 2.15$$

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:
1. A polyurethane product formed by reacting
   (a) an isocyanate selected from the group consisting of 4,4'-diisocyanatodiphenylmethane, isocyanates based on 4,4'-diisocyanatodiphenylmethane, and mixtures thereof,
   (b) at least one polyether polyol having at least two and no more than three hydroxyl groups,
   (c) at least one polymer polyol prepared by polymerizing an ethylenically unsaturated monomer or monomers in a relatively high molecular weight organic compound containing at least two hydroxyl groups, the amount of polymer polyol being such that the combination of component (b) and component (c) has an average hydroxyl functionality of from about 2.10 to about 2.30, and a solids content of from about 2 to about 15 percent by weight,
   (d) from about 5 to about 15 percent by weight based on the total weight of components (b), (c) and (d) of a compound selected from the group consisting of ethylene glycol, 1,4-butanediol and mixtures thereof, in the presence of
   (e) a blowing agent and, optionally, catalyst and surfactant, wherein the amount of component (a) is such that the isocyanate index is from about 94 to about 105.
2. The product of claim 1 wherein the combination of component (b) and component (c) has a solids content of from about 4 to about 10 percent by weight.
3. The product of claim 1 wherein component (d) comprises from about 5 to about 10 percent by weight based on the total weight of components (b), (c), and (d).
4. A process for the production of a polyurethane product comprising reacting
   (a) an isocyanate selected from the group consisting of 4,4'-diisocyanatodiphenylmethane, isocyanates based on 4,4'-diisocyanatodiphenylmethane, and mixtures thereof,
   (b) at least one polyether polyol having at least two and no more than three hydroxyl groups,

(c) at least one polymer polyol prepared by polymerizing an ethylenically unsaturated monomer or monomers in a relatively high molecular weight organic compound containing at least two hydroxyl groups, the amount of polymer polyol being such that the combination of component (b) and component (c) has an average hydroxyl functionality of from about 2.10 to about 2.30, and a solids content of from about 2 to about 15 percent by weight, (d) from about 5 to about 15 percent by weight based on the total weight of components (b), (c) and (d) of a compound selected from the group consisting of ethylene glycol, 1,4-butanediol and mixtures thereof, in the presence of (e) a blowing agent and, optionally, catalyst and surfactant, wherein the amount of component (a) is such that the isocyanate index is from about 94 to about 105.

5. The process of claim 4 wherein the combination of component (b) and component (c) has a solids content of from about 4 to about 10 percent by weight.

6. The process of claim 4 wherein component (d) comprises from about 5 to about 10 percent by weight based on the total weight of components (b), (c), and (d).

7. A polyol blend comprising (b) at least one polyether polyol having at least two and no more than three hydroxyl groups, (c) at least one polymer polyol prepared by polymerizing an ethylenically unsaturated monomer or monomers in a relatively high molecular weight organic compound containing at least two hydroxyl groups, the amount of polymer polyol being such that the combination of component (b) and component (c) has an average hydroxyl functionality of from about 2.10 to about 2.30, and a solids content of from about 2 to about 15 percent by weight.

8. The blend of claim 7 wherein the combination of component (b) and component (c) has a solids content of from about 4 to about 10 percent by weight.

9. The blend of claim 7 wherein an additional component (d) selected from the group consisting of ethylene glycol, 1,4-butanediol and mixtures thereof comprises from about 5 to about 10 percent by weight based on the total weight of components (b), (c), and (d).

10. A blend comprising (b) at least one polyether polyol having at least two and no more than three hydroxyl groups, (c) at least one polymer polyol prepared by polymerizing an ethylenically unsaturated monomer or monomers in a relatively high molecular weight organic compound containing at least two hydroxyl groups, the amount of polymer polyol being such that the combination of component (b) and component (c) has an average hydroxyl functionality of from about 2.10 to about 2.30, and a solids content of from about 2 to about 15 percent by weight, (d) from about 5 to about 15 percent by weight based on the total weight of components (b), (c) and (d) of a compound selected from the group consisting of ethylene glycol, 1,4-butanediol and mixtures thereof, (e) a blowing agent, and optionally, catalyst and surfactant.

11. The blend of claim 10 wherein the combination of component (b) and component (c) has a solids content of from about 4 to about 10 percent by weight.

12. The blend of claim 10 wherein component (d) comprises from about 5 to about 10 percent by weight based on the total weight of components (b), (c), and (d).

* * * * *